(12) United States Patent
Yang et al.

(10) Patent No.: US 9,236,639 B2
(45) Date of Patent: Jan. 12, 2016

(54) THERMOELECTRIC METHODS TO CONTROL TEMPERATURE OF BATTERIES

(75) Inventors: Jihui Yang, Lakeshore, CA (US); Kelly B. Ledbetter, Linden, MI (US); Francis R. Stabler, Troy, MI (US); David S. Scott, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2228 days.

(21) Appl. No.: 11/702,801

(22) Filed: Feb. 6, 2007
(Under 37 CFR 1.47)

(65) Prior Publication Data
US 2008/0311466 A1 Dec. 18, 2008

Related U.S. Application Data

(63) Continuation-in-part of application No. 10/739,789, filed on Dec. 18, 2003, now Pat. No. 7,384,704, and a continuation-in-part of application No. 11/028,836, filed on Jan. 4, 2005, now abandoned.

(60) Provisional application No. 60/590,879, filed on Jul. 23, 2004.

(51) Int. Cl.
| H01M 10/615 | (2014.01) |
| H01M 10/48 | (2006.01) |
| H01M 10/633 | (2014.01) |
| H01M 10/6572 | (2014.01) |
| H01M 10/613 | (2014.01) |
| H01M 10/658 | (2014.01) |

(52) U.S. Cl.
CPC .......... *H01M 10/486* (2013.01); *H01M 10/613* (2015.04); *H01M 10/615* (2015.04); *H01M 10/633* (2015.04); *H01M 10/658* (2015.04); *H01M 10/6572* (2015.04)

(58) Field of Classification Search
CPC ............ H01M 10/486; H01M 10/615; H01M 10/623; H01M 10/653; H01M 10/655
USPC ................................................ 429/71, 62, 83
See application file for complete search history.

(56) References Cited

U.S. PATENT DOCUMENTS

| 3,136,577 | A | | 6/1964 | Richard |
| 3,438,214 | A | | 4/1969 | Schmittle |
| 4,126,734 | A | * | 11/1978 | Walters .......................... 429/71 |
| 4,314,008 | A | * | 2/1982 | Blake ................................ 429/8 |
| 4,797,837 | A | | 1/1989 | Brooks |
| 5,507,103 | A | | 4/1996 | Merritt |
| 5,576,512 | A | | 11/1996 | Doke |
| 5,795,664 | A | | 8/1998 | Kelly |
| 5,900,717 | A | | 5/1999 | Lee |
| 5,970,719 | A | | 10/1999 | Merritt |
| 6,215,281 | B1 | | 4/2001 | Koch |
| 6,286,109 | B1 | * | 9/2001 | Pirdy ............................ 713/340 |
| 6,294,721 | B1 | | 9/2001 | Oravetz et al. |

(Continued)

*Primary Examiner* — Zachary Best
(74) *Attorney, Agent, or Firm* — BrooksGroup (57) ABSTRACT

A method of controlling a temperature of a battery is disclosed. The method includes providing a thermoelectric device in thermally-conductive contact with the battery, measuring an actual temperature of the battery, comparing the actual temperature of the battery to a reference temperature for the battery, heating the battery by operation of the thermoelectric device when the actual temperature is less than the reference temperature and cooling the battery by operation of the thermoelectric device when the actual temperature exceeds the reference temperature.

17 Claims, 9 Drawing Sheets

(56) References Cited

U.S. PATENT DOCUMENTS

| | | |
|---|---|---|
| 6,308,519 B1 | 10/2001 | Bielinski |
| 6,345,507 B1 | 2/2002 | Gillen |
| 6,455,186 B1 * | 9/2002 | Moores et al. ............... 429/71 |
| 6,955,055 B2 * | 10/2005 | Ebermann ................. 62/3.6 |
| 2002/0005216 A1 | 1/2002 | Oravetz et al. |
| 2003/0097845 A1 | 5/2003 | Saunders et al. |
| 2004/0195701 A1 * | 10/2004 | Attarwala ................ 257/783 |
| 2005/0133206 A1 | 6/2005 | Scott |

\* cited by examiner

FIG. 5B
section B:B

THERMOELECTRIC METHODS TO CONTROL TEMPERATURE OF BATTERIES

CROSS-REFERENCE TO RELATED APPLICATIONS

This application is a continuation-in-part of U.S. patent application Ser. No. 10/739,789 filed Dec. 18, 2003, a continuation-in-part of U.S. patent application Ser. No. 11/028,836 filed Jan. 4, 2005 and claims the benefit of U.S. Provisional Application Ser. No. 60/590,879 filed Jul. 23, 2004.

FIELD OF THE INVENTION

The present invention relates to thermoelectric devices which utilize electrical power to generate a thermal gradient. More particularly, the present invention relates to methods of controlling the temperature of batteries by using thermoelectric devices to cool or heat the batteries, as needed.

BACKGROUND OF THE INVENTION

Thermoelectric (TE) technology has attracted worldwide interest in recent years. TE devices can be used for cooling and electrical power generation purposes in a variety of applications. While much of the work in thermoelectric technology has focused on the development of new thermoelectric materials, incorporation of the newly-developed materials into TE devices and practical application of the TE devices in automotive and other applications is also being investigated.

Batteries, including those used in automotive applications, are characterized by optimum operational temperature windows. During operation, high battery temperatures due to consecutive charge-discharge cycles, hot weather, engine heat, etc., are common. This results in a short battery lifespan and degraded battery performance. On the other hand, low battery temperatures encountered during cold startup conditions in cold weather, for example, prohibit efficient battery operation due to increased internal electrical resistance.

Thermoelectric technology includes heating and cooling capabilities of TE devices. The basis of such heating and cooling capabilities is the Peltier effect, which is expressed using a Peltier circuit. A Peltier circuit is a TE device which includes two thermally-opposite sides. When an electrical current is applied to the Peltier circuit in one direction, one side of the TE device creates heat, and therefore, has heating capability while the other side absorbs heat, and therefore, has cooling capability. Reversing the polarity of the electrical current applied to the Peltier circuit creates the opposite effect.

Accordingly, a control scheme or method is needed which utilizes a TE device to cool or heat a battery, as required, using the Peltier effect.

SUMMARY OF THE INVENTION

One embodiment of the invention includes thermoelectric methods which are suitable to control the temperature of batteries in a variety of applications. The methods include providing a thermoelectric device; providing a battery in thermally-conductive contact with the thermoelectric device; measuring a temperature of the battery; comparing the measured temperature of the battery to a desired reference temperature; and heating or cooling the battery, as necessary, using the Peltier effect by transmitting a current through the thermoelectric device in an appropriate direction.

BRIEF DESCRIPTION OF THE DRAWINGS

The invention will now be described, by way of example, with reference to the accompanying drawings, in which.

DETAILED DESCRIPTION OF THE INVENTION

Figure 1:
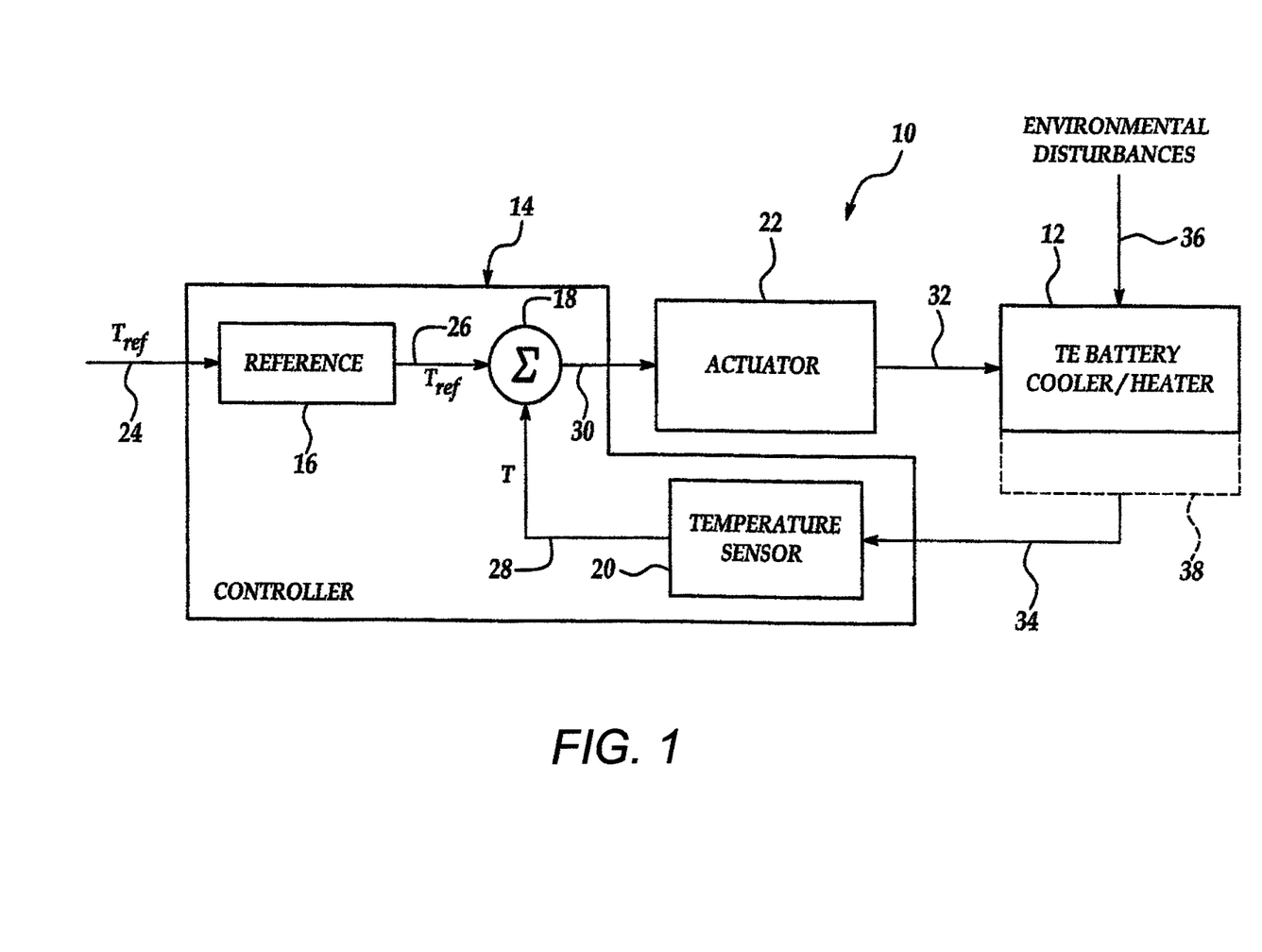
FIG. 1 is a schematic of a battery temperature control scheme according to the present invention.

Referring initially to FIG. 1, an illustrative embodiment of a thermoelectric (TE) battery control system, hereinafter system, according to the present invention is generally indicated by reference numeral 10. The system 10 includes a thermoelectric (TE) device 12 having a conventional Peltier circuit (not shown). Responsive to flow of electrical current in one direction through the Peltier circuit, heat is generated at one side and absorbed at the opposite side of the TE device 12. When current flows in the opposite direction through the Peltier circuit, the hot and cold sides of the TE device 12 are reversed.

A battery 38, such as an automotive battery, for example, is provided in thermally-conductive contact with one side of the TE device 12. The battery 38 may be any type of battery including but not limited to a lead acid battery, a nickel metal hydride battery or a lithium ion battery. Furthermore, the TE device 12 can be arranged in any desired configuration with respect to the battery 38. For example, the TE device 12 can be built into the battery assembly for the battery 38 or can form an enclosure surrounding the battery 38.

The system 10 further includes a controller 14, which may be a proportional/integral/derivative (PID) controller, for example. The controller 14 should be stable to environmental disturbances 36, such as heat losses and inflows, from the environment. The controller 14 may be any type of controller which is capable of changing the direction of electrical current through the Peltier circuit of the TE device 12 in order to heat or cool the battery 38 depending on a measured temperature of the battery 38, as will be hereinafter further described.

The controller 14 may include a temperature sensor 20 which is provided in thermally-conductive contact with the battery 38. The temperature sensor 20 measures the temperature of the battery 38 based on the reception of heat 34 from the battery 38. A comparator 18, the purpose of which will be hereinafter described, is connected to the temperature sensor 20. The temperature sensor 20 includes the capability to transmit an actual temperature transmission signal 28, which corresponds to the measured temperature (T) of the battery 38, to the comparator 18.

The controller 14 typically further includes a reference temperature database 16 into which reference temperature input 24 corresponding to a desired or reference temperature for the battery 38 may be programmed. The reference temperature ($T_{ref}$) for the battery 38 is the temperature which is required for optimum performance and durability of the battery 38. The reference temperature database 16 includes the capability to transmit a reference temperature transmission signal 26 to the comparator 18.

The comparator 18 is provided with the capability to compare the reference temperature ($T_{ref}$), received from the reference temperature database 16 via the reference temperature transmission signal 26, to the actual temperature (T) of the battery 38, received from the temperature sensor 20 via the actual temperature transmission signal 28, by calculating the temperature difference (e) according to the equation:

$$e = T - T_{ref}$$

An actuator 22 is connected to the comparator 18 to receive a comparator output signal 30, which corresponds to the value of e, from the comparator 18. The actuator 22 is, in turn, connected to the TE device 12 to control the direction of current through the Peltier circuit in the TE device 12, via a control input signal 32, depending on the value of e.

In operation of the system 10, the reference temperature ($T_{ref}$) input 24, corresponding to the desired operational temperature for the battery 38, is initially programmed into the reference temperature database 16. During operation of the battery 38, the temperature sensor 20 continually measures the actual temperature (T) of the battery 38 responsive to input of heat 34 from the battery 34. The temperature sensor 20 transmits the actual temperature transmission signal 28, corresponding to the measured temperature (T) of the battery 38, to the comparator 18. Simultaneously, the reference temperature database 16 transmits the reference temperature transmission signal 26, corresponding to the reference temperature ($T_{ref}$), to the comparator 18.

The comparator 18 calculates the value of e by subtracting the value of $T_{ref}$ from the value of T. Thus, in the event that T is higher than $T_{ref}$, e will have a positive value. This indicates an excessively high operational temperature of the battery 38. Therefore, the comparator 18 transmits the comparator output signal 30, which indicates the positive value of e, to the actuator 22. The actuator 22, in turn, causes flow of current through the Peltier circuit of the TE device 12 in a first direction to facilitate cooling of the battery 38, via the control input signal 32. Therefore, the value of T drops as the calculated value of e drops and approaches or reaches zero. At that point, the actuator 22, responsive to feedback control by the comparator 18 as facilitated by the temperature sensor 20 via the actual temperature transmission signal 28, terminates flow of current through the Peltier circuit of the TE device 12 in order to prevent further cooling of the battery 38 and maintain the value of T as close as possible to the value of $T_{ref}$. This ensures that the battery 38 operates at or near $T_{ref}$ for optimum performance, reliability and duration of the battery 38.

In the event that T is lower than $T_{ref}$, the value of e as calculated by the comparator 18 will have a negative value. This indicates an excessively low operational temperature of the battery 38, as may be the case, for example, upon initial start-up of an automobile or during operation of the battery 38 in cold weather. In that case, the comparator 18 transmits the comparator output signal 30, which now indicates the negative value of e, to the actuator 22. Via the control input signal 32, the actuator 22, in turn, causes flow of current through the Peltier circuit of the TE device 12 in a second direction in order to facilitate heating of the battery 38. Therefore, T rises and approaches or reaches $T_{ref}$ as the calculated value of e rises and approaches or reaches zero. At that point, the actuator 22, responsive to feedback control by the comparator 18 and the temperature sensor 20, terminates flow of current through the Peltier circuit of the TE device 12 in order to maintain the value of T as close as possible to the value of $T_{ref}$.

Figure 2:
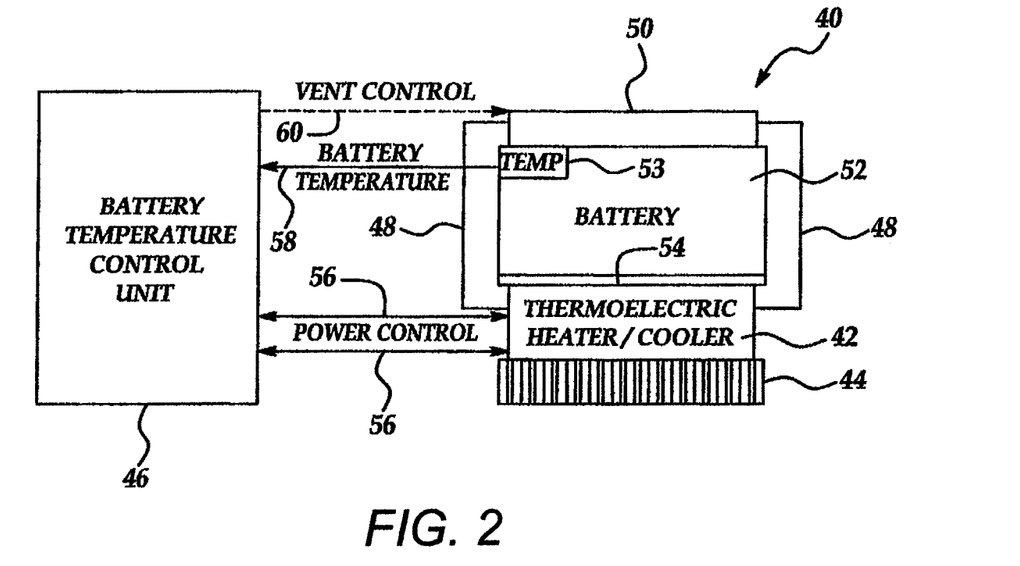
FIG. 2 is a schematic of a battery temperature control scheme according to an alternative embodiment of the present invention.

Referring next to FIG. 2, another illustrative embodiment of a thermoelectric (TE) battery control system, hereinafter system, of the present invention is generally indicated by reference numeral 40. The system 40 includes a thermoelectric (TE) device 42 which includes a conventional Peltier circuit (not shown). A battery 52, such as an automotive battery, for example, is disposed in thermally-conductive contact with one side of the TE device 42 typically through a thermal interface 54. The thermal interface 54 may be any suitable thermally-conductive material. Cooling fins 44 may be provided in thermally-conductive contact with the other side of the TE device 42.

The battery 52 may be contained inside a thermal enclosure 48, which may be any suitable thermally-insulating material. The thermal enclosure 48 serves to thermally insulate the battery 52 from environmental heat during operation. One or multiple controllable heat vents 50 may be provided in the thermal enclosure 48 to either retain heat in the thermal enclosure 48 or dissipate excessive heat from the battery 52 depending on the thermal requirements of the battery 52. A temperature sensor 53 is typically provided in thermal contact with the battery 52.

A battery temperature control unit 46 is connected to the temperature sensor 53. The temperature sensor 53 includes the capability to transmit temperature transmission signals 58, which correspond to a measured temperature of the battery 52, to the battery temperature control unit 46. The battery temperature control unit 46 may be connected to the heat vent or vents 50 to control the position of the vent or vents 50, via a vent control signal 60, depending on the measured temperature of the battery 52, as will be hereinafter described. The battery temperature control unit 46 is further connected to the TE device 42 to control the direction of current flow through the Peltier circuit, and therefore, facilitate heating or cooling of the battery 52, via TE device control signals 56, depending on the measured temperature of the battery 52. The battery temperature control unit 46 may be designed and programmed to utilize the same method as that heretofore described with respect to the temperature sensor 20, reference temperature database 16, comparator 18 and actuator 22 of the system 10 shown in FIG. 1 in order to determine and effect the heating and cooling requirements of the battery 52.

In operation of the system 40, a reference temperature which corresponds to the optimum operating temperature of the battery 52 is initially programmed into the battery temperature control unit 46. During operation of the battery 52, the temperature sensor 53 continually measures the temperature of the battery 52 and transmits this information, in the form of the temperature transmission signal 58, to the battery temperature control unit 46. In the event that the measured temperature of the battery 52 is higher than the reference temperature, the battery temperature control unit 46, via the TE device control signal 56, induces flow of current in a first direction through the Peltier circuit of the TE device 42. This causes cooling of the battery 52 in order to lower the measured temperature of the battery 52 to or near the reference temperature. Additionally, the battery temperature control unit 46, via the vent control signal 60, may facilitate opening of the vent or vents 50 to dissipate additional heat from the battery 52. As the TE device 42 cools the battery 52, the cooling fins 44 dissipate heat from the hot side of the TE device 42. This increases the battery-cooling efficiency of the TE device 42.

In the event that the measured temperature of the battery 52 is lower than the reference temperature, as may be the case during start-up of an automobile or during operation of the battery 52 in cold weather, for example, the battery temperature control unit 46, via the TE device control signal 56, induces flow of current in a second direction through the Peltier circuit of the TE device 42. Consequently, the temperature of the battery 52 rises and approaches or reaches the reference temperature. The battery temperature control unit 46, via the vent control signal 60, may additionally facilitate closing of the vent or vents 50 to retain heat in the thermal enclosure 48 and raise the temperature of the battery 52.

Figure 3:
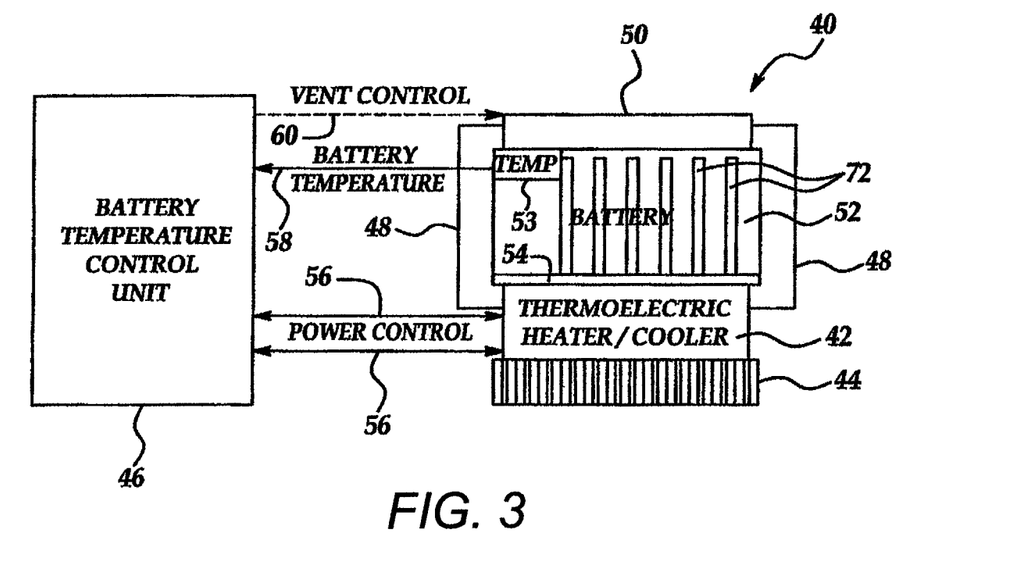
FIG. 3 is a schematic of a battery temperature control scheme according to still another embodiment of the present invention.

Referring next to FIG. 3, another illustrative embodiment of the TE battery control system, hereinafter system, of the present invention is generally indicated by reference numeral 70. The system 70 is similar in design to the system 40 heretofore described with respect to FIG. 2, except multiple heat-conductive strips 72 are packaged into the battery 52. The heat-conductive strips 72 may be suitable thermally-conductive material and facilitate efficient temperature control during operation of the battery 52 and system 70.

FIGS. 4-14 illustrate other embodiments of the invention.

Figure 4:
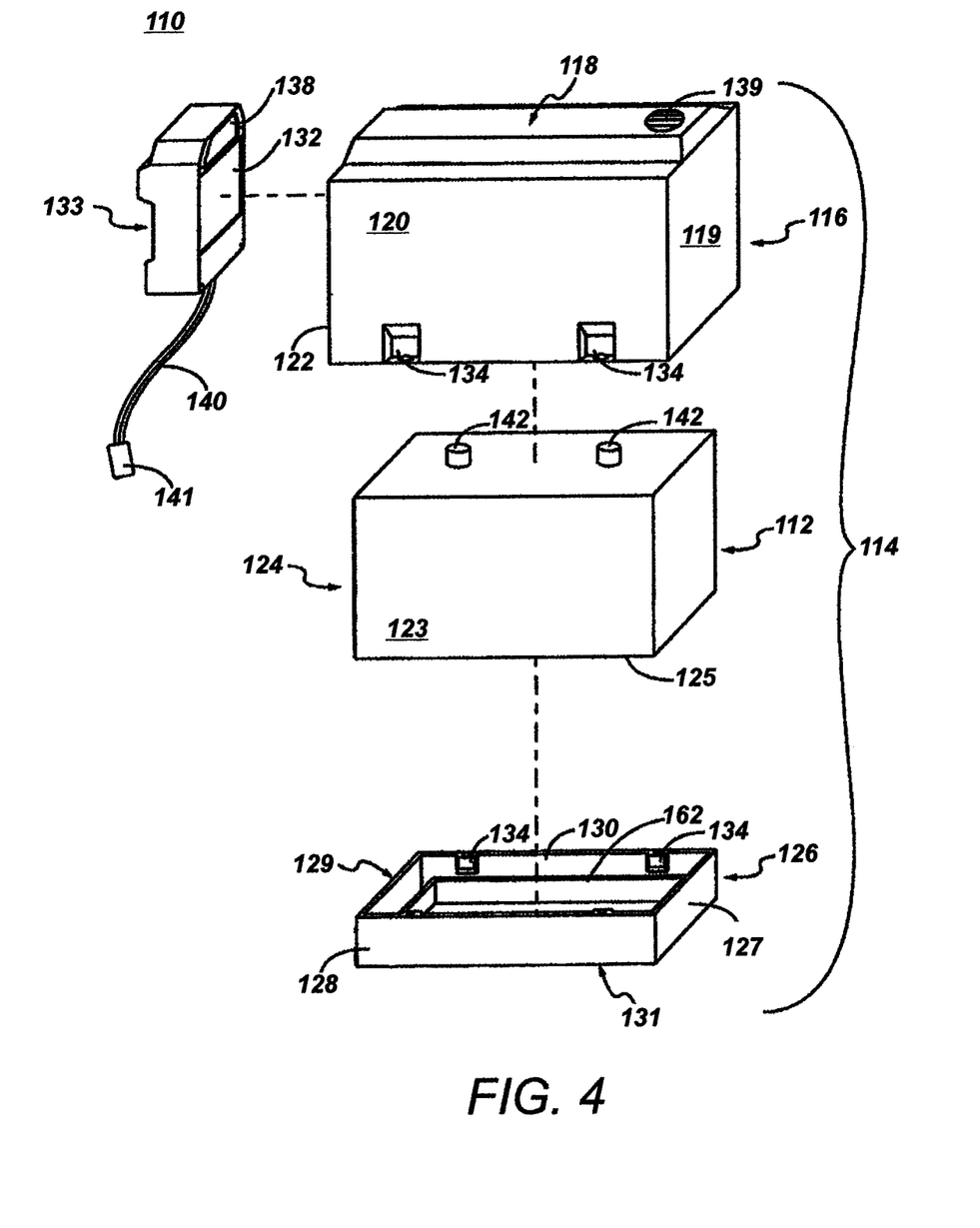
FIG. 4 is an exploded perspective view of an automotive battery and a temperature control apparatus in accordance with a first exemplary embodiment of the invention.

Referring to FIG. 4, an exploded perspective view is shown of a temperature control apparatus 110 for an automotive battery 112 in accordance with an exemplary embodiment of the present invention. Apparatus 110 can maintain the internal temperature of the battery, which in this exemplary embodiment is a rechargeable battery such as a rechargeable lead acid storage battery, within a predetermined temperature range even though apparatus 110 is exposed to a surrounding or ambient atmosphere that can have hostile or adverse temperatures that are substantially higher or lower than the predetermined temperature range, which can be any number of temperatures ranges. For example, in accordance with one exemplary embodiment, the temperature range can be between negative twenty degrees centigrade (−20.degree. C.) and positive fifty degrees centigrade (+50.degree. C.). Maintaining the internal temperature of battery 112 within this temperature range (i.e., heating or cooling battery 112 when the temperature of the battery falls below or exceeds the predetermined temperature thresholds of the temperature range) has numerous advantages, such as enhancing battery performance and extending battery life.

Apparatus 10 preferably includes an insulating enclosure or case 114 for housing battery 112. Enclosure 114 can be made of a lightweight heat insulating material such as either cross-linked polypropylene or fiberglass for instance, which can have a thickness of approximately one-half inch. Enclosure 114 has a top or upper portion 116 having a top 118 and side walls, such as walls 119, 120 and 122. The top 118 and walls 119, 120 and 122 of top portion 116 substantially enclose and preferably encloses all of battery 112 except for the lower portion 123, a portion of the end 124 and the bottom 125 of battery 112. Bottom portion 126 of enclosure 114 has walls 127, 128, 129 and 130 for enclosing the lower portion 123 not enclosed by enclosure portion 116 and a bottom member 131 for enclosing the bottom 125 of battery 112. When thermoelectric module 133 is affixed to top portion 116, surface 132 of a heat transfer structure included in thermoelectric module 133 encloses or covers the portion of the end surface 124 of battery 112 not covered by top portion 116 and bottom portion 126.

Fastener structures 134 fasten top portion 116 and bottom portion 126. When top portion 116 and bottom portion 126 and thermoelectric module 133 are fastened together, battery 112 is enclosed and at least partially insulated from hostile temperatures of the ambient atmosphere otherwise surrounding battery 112. This assists the control of the temperature of battery 112 within the predetermined temperature range by regulating the temperature of an airflow that is supplied by module thermoelectric 133 through vent 138 into enclosure 114. The temperature of battery 112 can also be controlled by regulating the relative temperature that is directly conducted through surface 132 of thermoelectric module 133 to a portion of the adjacent surface 124 of the battery 112.

Figure 5:
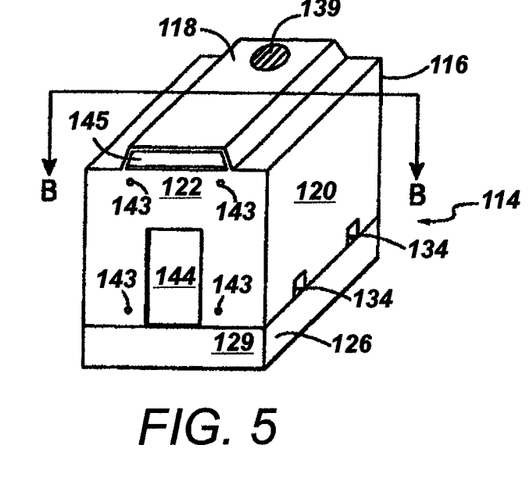
FIG. 5 is a perspective end view of a battery enclosure for the temperature control apparatus of FIG. 4.
Figure 5A:
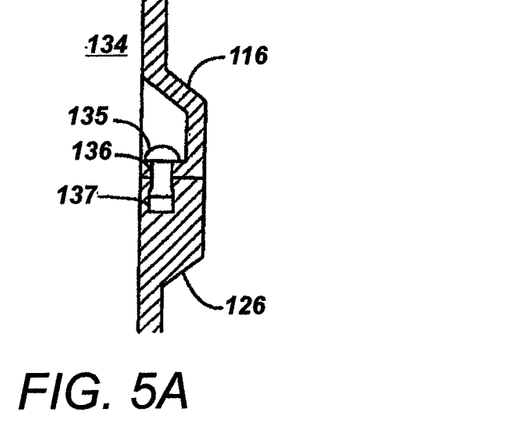
FIG. 5A is an enlarged detail view of a fastener structure for the battery enclosure of FIG. 5.

FIG. 5 is a perspective view of enclosure 114 housing the battery 112 and top portions 116 and bottom portion 126 held together by fastener structures 134. FIG. 5A shows an enlarged view of one of the four fastener structures 134 for attaching enclosure top portion 116 and bottom portion 126. Each fastener structure 134 can include a snap 135 that is shown extending through aligned apertures 136 and 137 in respective portions 116 and 126. Snaps 135 are respectively engaged or disengaged when it is desired to join or separate portions 116 and 126. However, any number of fastener configurations can be used in accordance with the present invention, such as belts with snaps or buckles, for example and without limitation.

As shown in FIG. 4, the heating or cooling air is exhausted through vent 139 of top portion 116 to allow air circulation within enclosure 114. Power supply line 140 for thermoelectric module 133 can be electrically connected through connector 141, which can be connected in a known manner to conductors passed through a surface of top portion 116 to posts 142 of battery 112, for instance. Alternatively, connector 141 can be connected to another battery or other electrical power source.

Figure 5B:
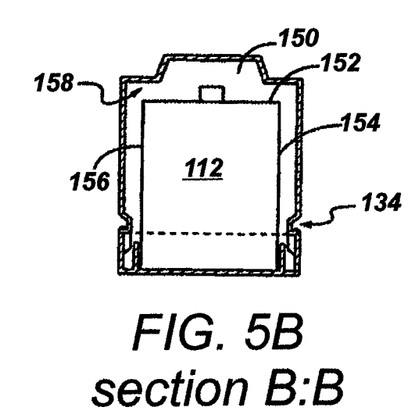
FIG. 5B is a view of cross section B-B of the battery enclosure of FIG. 5.

FIG. 5 shows the front surfaces of end walls 122 and 129 of respective portions 116 and 126 of enclosure 114. Apertures 143 are provided in the end wall 122 of top portion 116 to facilitate the mounting of the thermoelectric module 133 by a fastener (not shown), such as rivets. End wall 122 also has apertures 144 and 145. During assembly, heat transfer surface 132 of thermoelectric module 133 as shown in FIG. 4 is positioned or aligned with aperture 144 to allow heat or cold air to be conducted directly from heat transfer surface 132 through wall 122 to a significant portion of end surface 124 of battery 112. Thus, when apparatus 110 is assembled, surface 132 is positioned to contribute to the control of the temperature of battery 112. In addition, when apparatus 110 is assembled, vent 138 of thermoelectric module 133 as shown in FIG. 4 is aligned with aperture 145 of FIG. 5 to allow hot or cold air from thermoelectric module 133 to be circulated over other surfaces of battery 112 within enclosure 114. A cross-sectional end view taken along lines B-B of FIG. 5 is shown in FIG. 5B of the air circulation space of chamber 150 for receiving air exiting from thermoelectric module 133. Chamber 150 is located between the top surface 152 and the side surfaces 154 and 156 of battery 112 and the inside surface 158 of enclosure 114.

Figure 6:
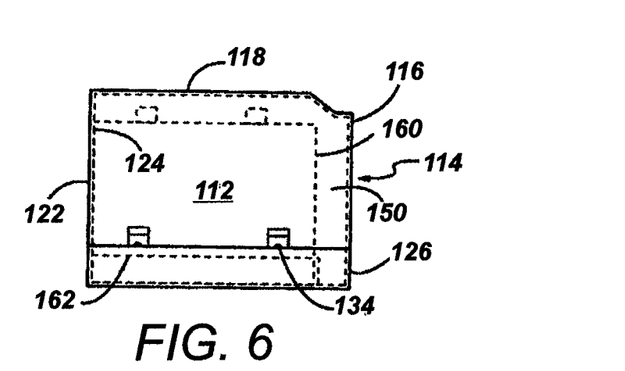
FIG. 6 is a side view of the battery enclosure of FIG. 5.
Figure 7:
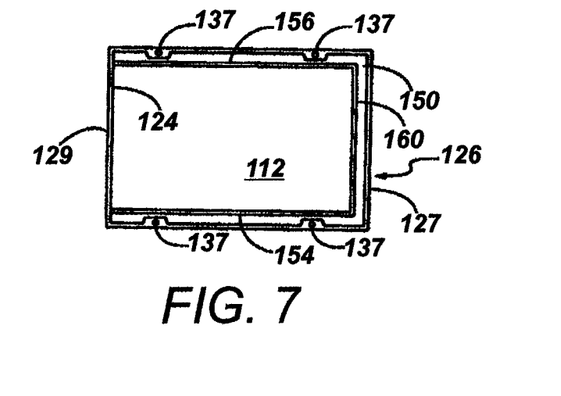
FIG. 7 is a plan view of the battery and the bottom portion of the battery enclosure of FIG. 5.

FIG. 6 is a side view of enclosure 114 showing the location of the back surface 160 of battery 112. Thus, chamber 150 allows the airflow from thermoelectric module 133 to pass over and thereby also heat or cool battery surfaces 152, 154, 156 and 160. A battery tray 162 for holding battery 112 is preferably installed or formed in bottom portion 126 as shown by solid lines in FIG. 4 and by dashed lines in FIG. 6. FIG. 7 is a top view of bottom portion 126 and battery 112 and shows chamber 150 surrounding battery surfaces 154, 156 and 160 and apertures 137 in portion 126 for receiving snaps 135 of fastener structure 134.

Figure 8:
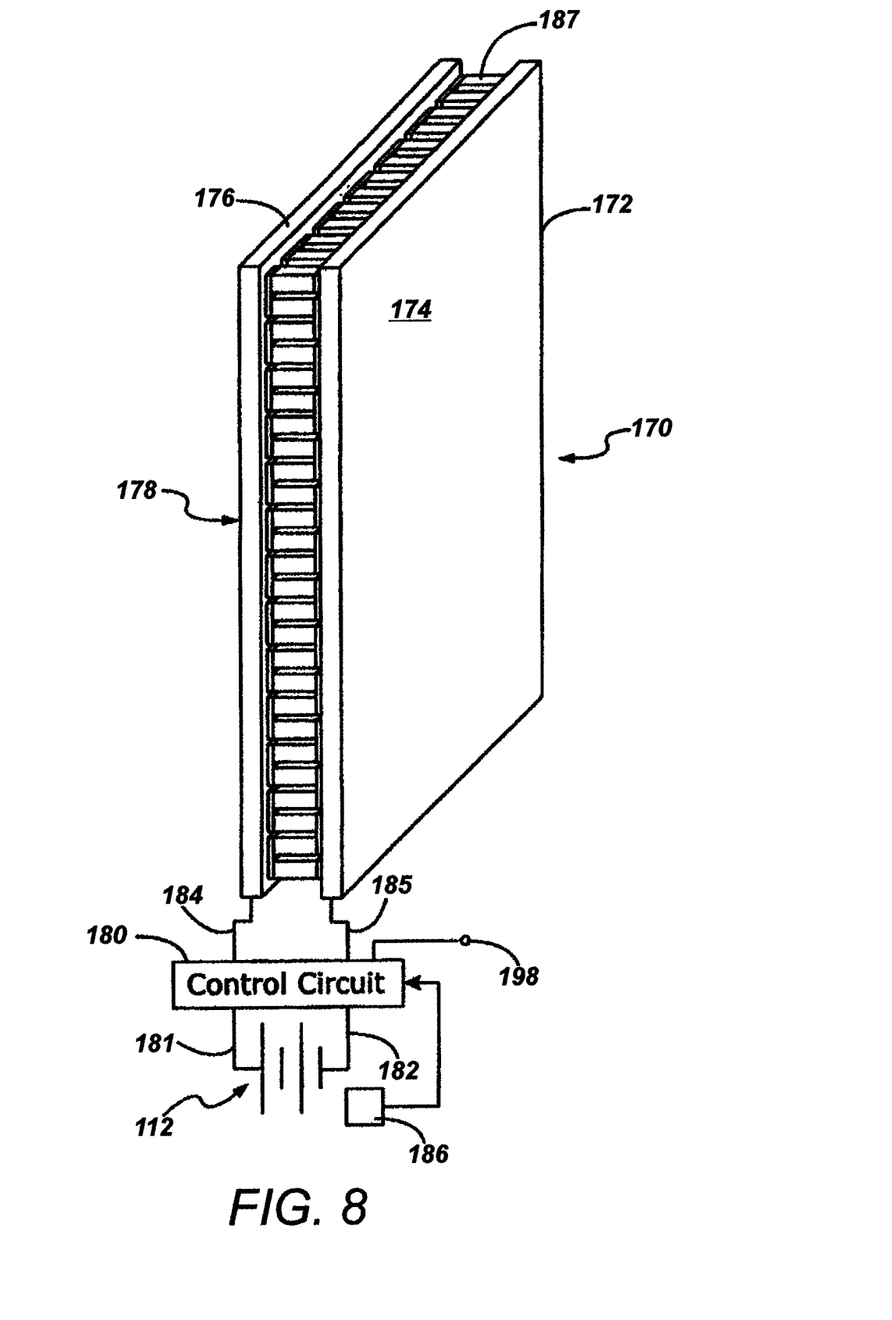
FIG. 8 is a perspective view of a thermoelectric device and a schematic diagram of control circuitry for the thermoelectric device.
Figure 11:
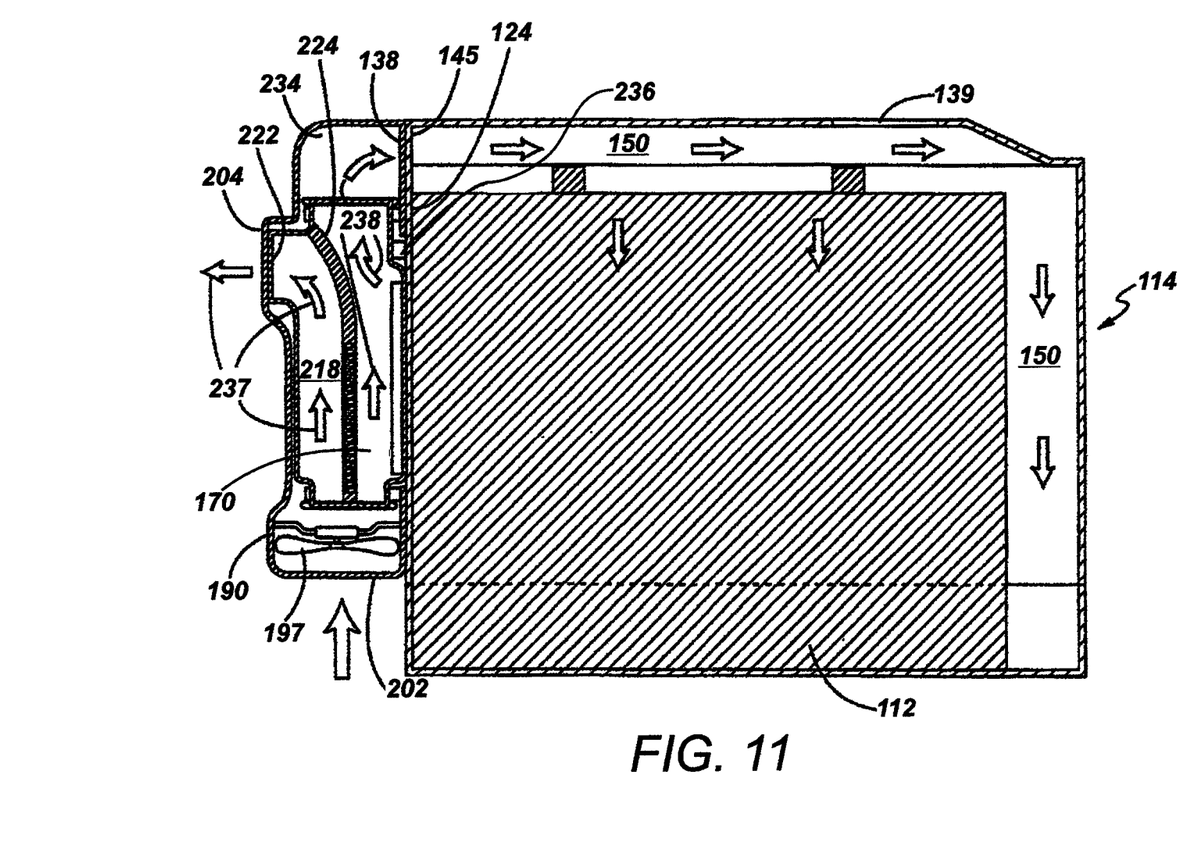
FIG. 11 is a side view showing the assembled thermoelectric module, battery enclosure and battery.

FIG. 8 is a perspective view of a conventional thermoelectric device 170 utilized by the thermoelectric module 133 as shown in FIG. 4. Thermoelectric device 170 includes a substrate 172 having a flat surface 174 that is thermally coupled by airflow to heat or cool battery 112 as shown in FIG. 11. Thermoelectric device 170 further includes another substrate 176 having another flat surface 178 that is thermally coupled by another airflow to the ambient environment as also shown in FIG. 11. Control circuit 180 electrically couples electrical current from battery 112, for instance, via input conductors 181 and 182 to output conductors 184 and 185 that are connected to thermoelectric device 170. Temperature sensor 186 monitors the temperature of battery 112 and provides a control signal to control circuit 180 indicative of the temperature of battery 112. Thermoelectric device 170 utilizes the properties of certain semiconductor materials 187 to develop a thermal gradient across substrates 172 and 176 in the presence of the current flow. Conventional thermoelectric devices utilize P-type and N-type semiconductors for the thermoelectric material 187. Generally, these materials 187 are arrayed in the rectangular assembly 170 between substrates 172 and 176. However, any number of configurations can be used in accordance with the present invention.

Thermoelectric device 170 generates a first temperature (e.g., a lower temperature) on surface 174 for cooling airflow and a second temperature (e.g., a higher temperature) that is greater than the first temperature on the other surface 178 for heating airflow in response to the electrical current passing through the thermoelectric device 170 having a first direction. Also, thermoelectric device 170 generates a third temperature (e.g., a higher temperature) on surface 174 for heating airflow and a fourth temperature that is less than the third temperature (e.g., a lower temperature) on surface 178 for cooling airflow in response to the direction of the electrical current passing through device 150 having a direction other than the first direction, such as the direction that is substantially opposite to the first direction. Control circuit 180 changes the direction of current flow through device 170 by reversing polarity in response to sensor 186 indicating that the temperature of the battery 112 has changed from exceeding an upper temperature threshold, such as positive forty-five degrees centigrade (45.degree. C.), to falling below a lower temperature threshold, such as negative fifteen degrees centigrade (15.degree. C.), for instance. If cooling of the battery 112 is desirable (e.g., the temperature of the battery is greater than the upper temperature threshold of the desired temperature range), then heat is transferred from the battery to the ambient environment by thermoelectric device 170. Alternatively, if heating of the battery 112 is desirable (e.g., the temperature of the battery is less than the lower temperature threshold of the desired temperature range), then heat is transferred from the ambient environment or atmosphere to battery 112 by thermoelectric device 170. If the temperature of battery 112 is within the desired temperature range (i.e., approximately between the lower temperature threshold and the upper temperature threshold), then control circuit 180 minimizes or discontinues the electrical current flow to thermoelectric device 170 to minimize heat exchange.

Figure 9:
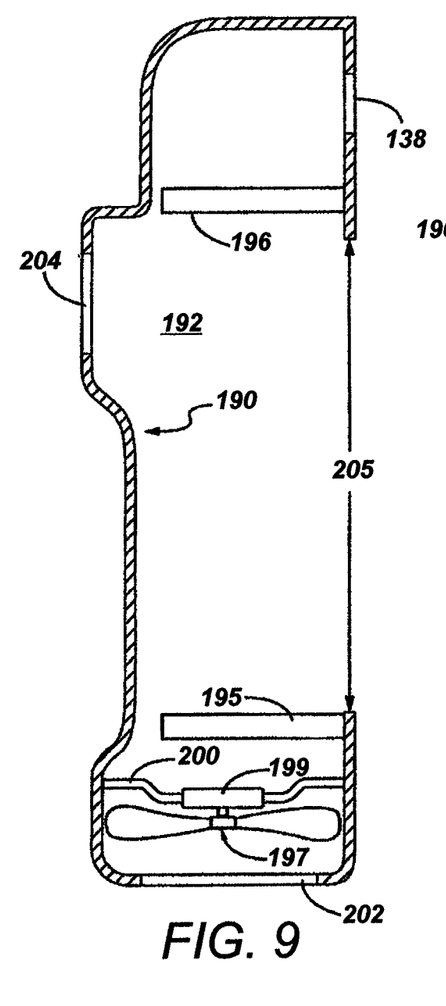
FIG. 9 is a plan view of a housing and a fan for a thermoelectric module.
Figure 9A:
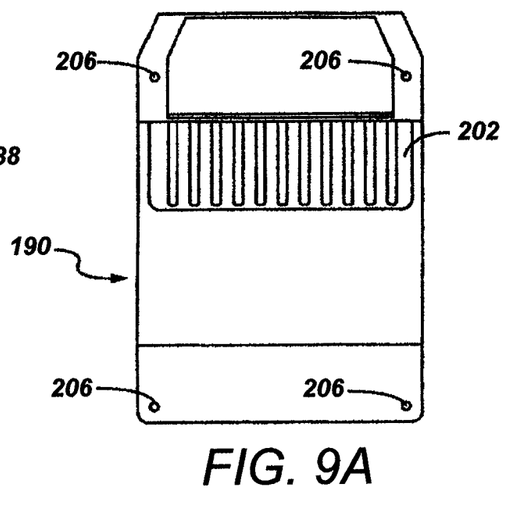
FIG. 9A is an end view of the housing of FIG. 9.

FIG. 9 shows a plan view of housing 190 of the thermoelectric module 133. Housing 190 provides an enclosure 192 for the heat exchanger assembly 194 of FIG. 10. Straps 195 and 196 are configured to hold assembly 194 in housing 190. Fan assembly 197 has an electric motor 199, which can be electrically connected between ground and fan control output terminal 198 of control circuit 180 as shown in FIG. 8. Fan assembly 197 is at least partially but preferably substantially affixed by bracket 200 to housing 190. Control circuit 180 can operate fan 197 when thermoelectric device 170 is energized. Non-shaded areas 202 and 204 of housing 190, respectively, indicate the ambient air input grill and the ambient air output grill or openings/apertures for the ambient airflow driven by fan 197. As shown in FIG. 11, heat transfer occurs by vent 138 providing heated or cooled air through the input vent 145 into chamber 150 for enclosure 114 when it is desirable to convectively heat or cool battery 112. Opening 205 shown in FIG. 9 of housing 190 allows heat transfer structure 230 of FIG. 10 to be aligned with the enclosure opening 144 shown in FIG. 5. FIG. 9A is an end view of housing 190 showing the outside surface of ambient air input grill 202. Holes 206 facilitate the mounting of housing 190 to holes 143 of top portion 116 of insulated case 114 by rivets or other fastener structures as previously mentioned in this detailed description.

Figure 10:
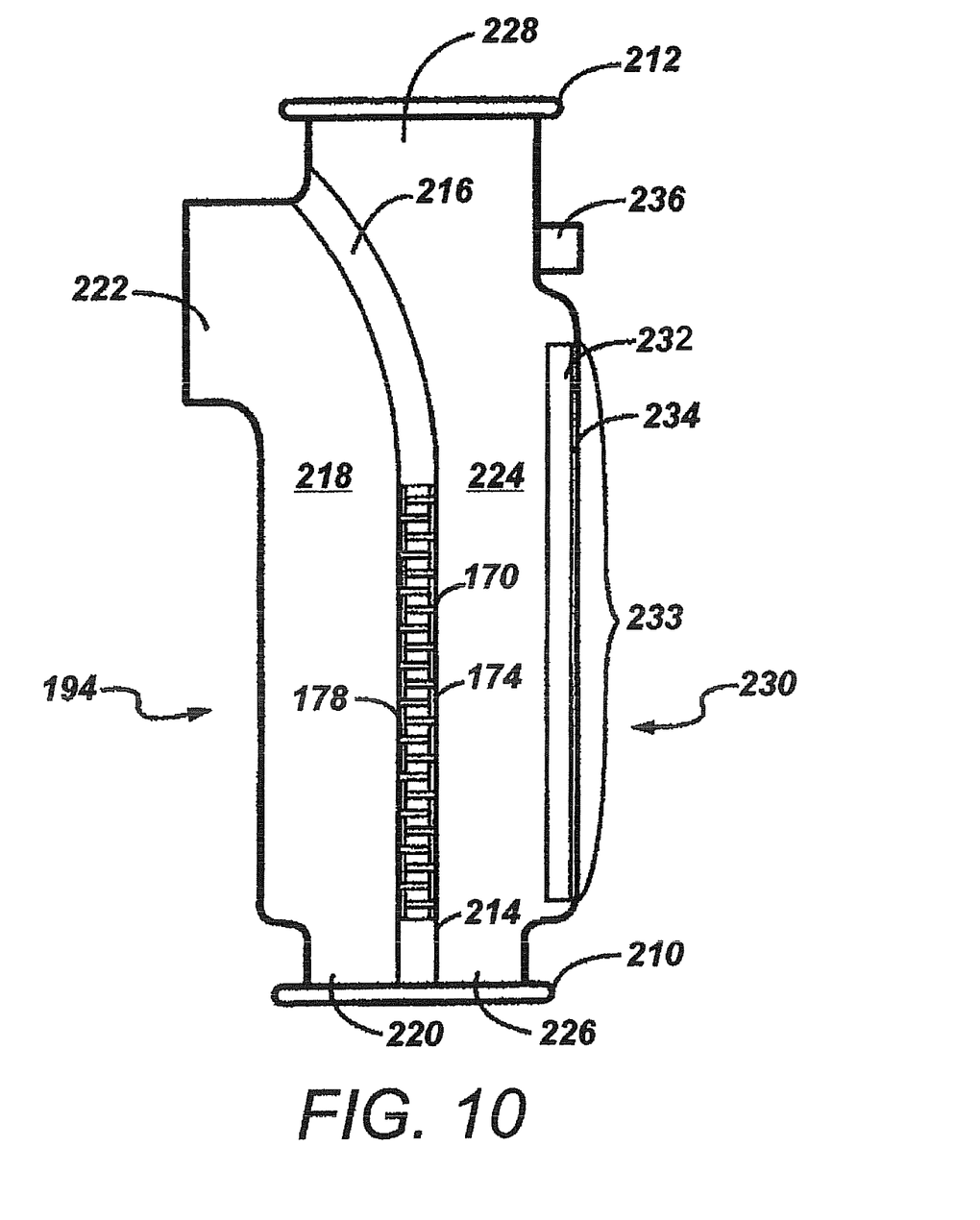
FIG. 10 is a plan view of a heat exchanger for the thermoelectric module of FIG. 9.

FIG. 10 is a plan view of heat exchanger assembly 194. Straps 210 and 212 are arranged to be fastened to respective straps 195 and 196 of housing 190 of FIG. 9 for holding assembly 194 in housing 190. Thermoelectric assembly 194 includes the thermoelectric device 170, which is attached to and held in place by baffles 214 and 216. Ambient air duct 218 conducts ambient air from input port 220 through the interior region past surface 178 of device 170 to output port 222. Battery temperature control duct 224 conducts air through the interior region from input port 226 to output port 228 past surface 174 of device 170 and past heat transfer structure 230. As previously described in this detailed description, such airflows can be either heated or cooled by device thermoelectric 170. If the battery temperature control airflow is heated by surface 174 of thermoelectric device 170 in duct 224, then the airflow in duct 218 is cooled by surface 178 and vice versa. The airflow in duct 218 thermally couples surface 178 of thermoelectric device 170 to the ambient atmosphere. Heat transfer structure 230 includes a thermal spreader 232 and a thermal interface layer 234 for direct contacting conductive heat transfer either to or away from battery surface 124. The thermal spreader 232 is formed from a heat conducting material such as aluminum having a thickness of five tenths a millimeter (0.5 mm), for example. The layer 234 can be an adhesive backed fiber material placed on the surface of spreader 232 for interfacing with end portion 124 of battery 112 and for protecting spreader 232 from abrasion by battery 112. Heat transfer structure 230 is affixed in an opening in air duct 224 and forms a portion of the wall of duct 224. Control circuit 180 and battery temperature control sensor 186 are included in package 236 on the outside of duct 224.

FIG. 11 shows an assembly including housing 190, ducts 218 and 224, battery 112, package 236 and battery enclosure 114. The position of package 236, which includes control circuit 180 and sensor 186 enables control circuit 180 to be thermally coupled by sensor 186 to battery 112. Control circuit 180 is electrically coupled between the current source or battery 112 and thermoelectric device 170 so that control circuit 180 selectively controls the current through thermoelectric device 170 in response to the temperature of battery 112 indicated by sensor 186. Fan 197 draws ambient air in through grill 202 and pushes the airflow through the interior region of duct 218 and out of grill 222 as indicated by arrows 237. Furthermore, fan 197 draws battery temperature control air in through grill 202 and pushes the airflow through the interior region of duct 224 and through a portion 235 of housing 190 and through abutting vents 138 and 145 into chamber 150 of enclosure 114 as indicated by arrows 238. Thus portion 235 of housing 190 completes the airflow path from output port 228 of FIG. 10 to chamber 150 and provides an airflow path that thermally couples surface 174 shown in FIG. 10 of thermoelectric device 170 to battery 112. Vent 145 facilitates the circulation of the temperature controlling air around the surfaces of battery 112. The thermoelectric device 170 exchanges heat between the airflows in the interior regions of air ducts 218 and 224 to regulate the temperature of the battery 112 and to maintain the temperature of the battery 112 within the predetermined desired temperature range.

Figure 12:
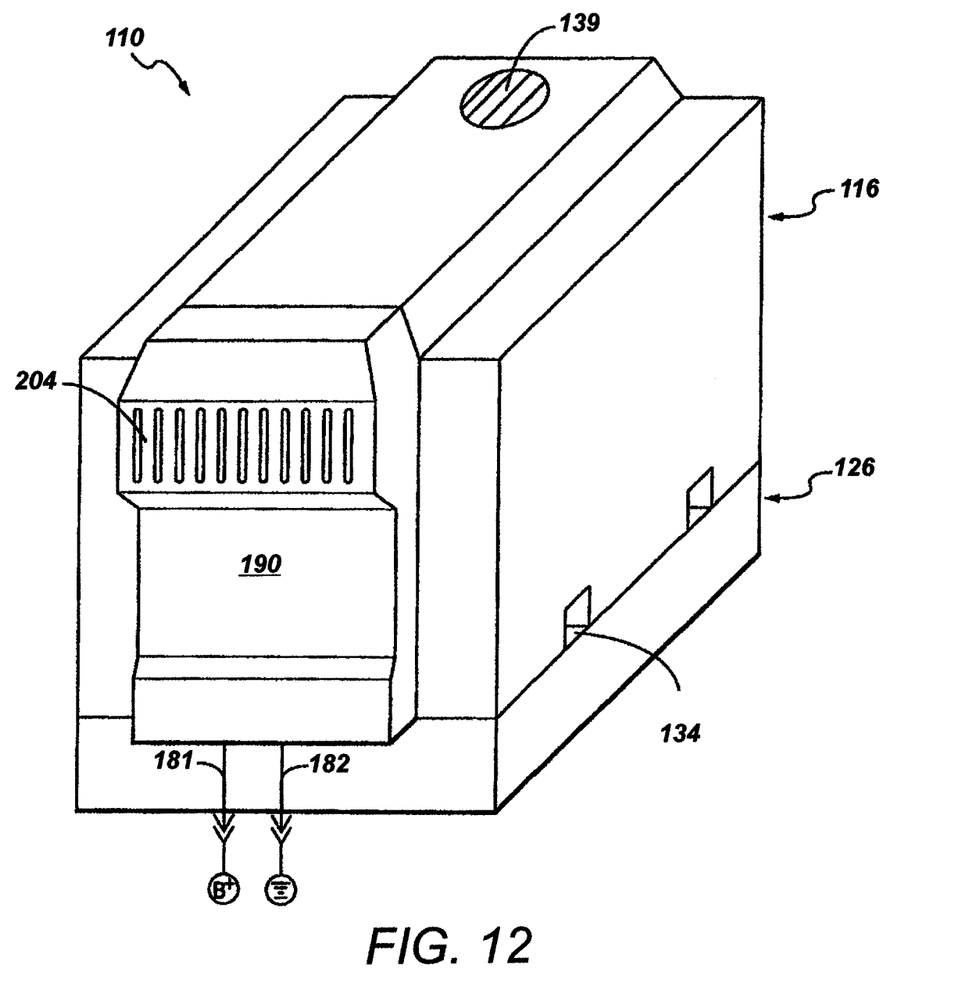
FIG. 12 is a perspective view of the assembled temperature control apparatus of FIG. 4.

Opening 205 of housing 190 of FIG. 9 is aligned with opening 144 of enclosure 114 of FIG. 5 and with opening 233 of FIG. 10. This enables heat transfer structure 230 to directly transfer or conduct heat or cold through the interior region of duct 224 between adjacent surface 124 of battery 112 and surface 174 of device 170 as shown in FIG. 11. FIG. 12 is a perspective view of the assembled temperature control apparatus 110 showing another view of ambient air exit grill 204 of housing 190. Electrical power input conductors 181 and 182 for control circuit 180 of package 236 are shown coming out of housing 190 of module 133. Conductors 181 and 182 connect circuit 180 to a separate power source.

In view of the foregoing, it should be appreciated that there has been provided an improved method and an apparatus 110 that controls the temperature of battery 112 and maintains the temperature within a predetermined temperature range. This protects the battery 112 from prolonged exposure to excessively hot and cold temperatures. Such temperature control results in numerous advantages such as increased performance and longevity for battery 112. The protection is accomplished in an inexpensive, simple, efficient, reliable and expeditious manner.

While the preferred embodiments of the invention have been described above, it will be recognized and understood that various modifications can be made in the invention and the appended claims are intended to cover all such modifications which may fall within the spirit and scope of the invention.

The invention claimed is:

1. A method of controlling a temperature of a battery, comprising:
   providing a thermoelectric device that is part of a thermoelectric module;
   providing a thermal spreader that is part of said thermoelectric module and that is in direct contact conductive heat transfer with said battery, said thermal spreader being parallel spaced from a first surface of said thermoelectric device such that the first surface of said thermoelectric device is thermally coupled with a portion of a surface of said battery via said thermal spreader;
   providing a first air duct that is between said thermoelectric device and said thermal spreader in said thermoelectric module, said first air duct thermally coupling said first surface of said thermoelectric device in convective heat transfer with said battery via an airflow path;
   providing a second air duct that is between said thermoelectric device and an outer wall of said thermoelectric module, said second air duct thermally coupling a second surface of said thermoelectric device to the ambient atmosphere through said second air duct;
   measuring an actual temperature of said battery;
   comparing said actual temperature to a reference temperature for said battery;
   heating said battery by operation of said thermoelectric device through said conductive heat transfer and convective heat transfer when said actual temperature is less than said reference temperature; and
   cooling said battery by operation of said thermoelectric device through said conductive heat transfer and convective heat transfer when said actual temperature exceeds said reference temperature.

2. The method of claim 1 further comprising providing an enclosure for the battery having at least one controllable vent and retaining heat in said battery when said actual temperature is less than said reference temperature by closing said controllable vent.

3. The method of claim 1 further comprising providing an enclosure for the battery having at least one controllable vent and venting heat from said battery when said actual temperature exceeds said reference temperature by opening said controllable vent.

4. The method of claim 1 further comprising retaining heat in said battery when said actual temperature is less than said reference temperature and venting heat from said battery when said actual temperature exceeds said reference temperature.

5. The method of claim 1 further comprising thermally insulating said battery from environmental heat.

6. The method of claim 1 further comprising dissipating heat from said thermoelectric device.

7. The method of claim 6 further comprising thermally insulating said battery from environmental heat, retaining heat in said battery when said actual temperature is less than said reference temperature and venting heat from said battery when said actual temperature exceeds said reference temperature.

8. The method of claim 1 wherein said comparing said actual temperature to a reference temperature for said battery comprises calculating a temperature difference by subtracting said reference temperature from said actual temperature and cooling said battery when said temperature difference is a positive value, and heating said battery when said temperature difference is a negative value.

9. A method of controlling a temperature of a battery, comprising:
   providing a thermoelectric device that is part of a thermoelectric module;
   providing a thermal spreader that is part of the thermoelectric module and that is in direct contact conductive heat transfer with said battery, said thermal spreader being spaced from a first surface of said thermoelectric device such that the first surface of said thermoelectric device is thermally coupled with a portion of a surface of said battery via said thermal spreader;
   providing an air flow duct that is between said thermoelectric device and said thermal spreader in said thermoelectric module and that thermally couples the first surface of said thermoelectric device in convective heat transfer with said battery via an airflow path;
   thermally insulating said battery from environmental heat;
   measuring an actual temperature of said battery;
   establishing a reference temperature for said battery;

calculating a temperature difference by subtracting said reference temperature from said actual temperature;

heating said battery by operation of said thermoelectric device through said conductive and convective heat transfer when said temperature difference is a negative value; and cooling said battery by operation of said thermoelectric device through said conductive and convective heat transfer when said temperature difference is a positive value.

10. The method of claim 9 further comprising providing an enclosure for the battery having at least one controllable vent and retaining heat in, said battery, when said actual temperature is less than said reference'temperature by closing said controllable vent.

11. The method of claim 9 further comprising providing an enclosure for the battery having at least one controllable vent and venting heat from said battery when said actual temperature exceeds said reference temperature by closing said controllable vent.

12. The method of claim 11 further comprising dissipating heat from said thermoelectric device through said conductive heat transfer, convective heat transfer and/or venting through said controllable vent.

13. A method as described in claim 1 further including protecting said thermal spreader from abrasion with said battery with a layer of adhesive backed fiber material.

14. A method as described in claim 1 further comprising packaging within said battery heat conductive strips.

15. A Method as described in claim 9 further comprising positioning said thermal spreader through an aperture provided in a thermal insulation of said battery to engage a direct contacting conductive heat transfer with a significant portion of an adjacent surface of said battery.

16. A method as described in claim 15 further including protecting said thermal spreader from abrasion with said battery with a layer of adhesive backed fiber Material.

17. A method as described in claim 9 further comprising packaging within said battery heat conductive strips.

* * * * *